US006840367B2

(12) United States Patent
Tucker

(10) Patent No.: US 6,840,367 B2
(45) Date of Patent: Jan. 11, 2005

(54) MATERIAL HANDLING AND MANUFACTURING SYSTEM AND METHOD

(76) Inventor: Richard R. Tucker, 2122 Wabash Ave., Terre Haute, IN (US) 47802

( * ) Notice: Subject to any disclaimer, the term of this patent is extended or adjusted under 35 U.S.C. 154(b) by 0 days.

(21) Appl. No.: 10/461,160

(22) Filed: Jun. 16, 2003

(65) Prior Publication Data

US 2004/0250415 A1 Dec. 16, 2004

(51) Int. Cl.[7] ............................................. B23P 21/00
(52) U.S. Cl. ...................................... 198/346; 29/33 P
(58) Field of Search ......................... 52/174, 175, 176; 29/729, 739, 742, 33 P; 414/266, 268, 286, 800, 807; 198/346, 950; 700/230

(56) References Cited

U.S. PATENT DOCUMENTS

| | | | | |
|---|---|---|---|---|
| 1,577,184 A | * | 3/1926 | Fitch | 414/340 |
| 1,944,771 A | * | 1/1934 | Webb et al. | 414/800 |
| 3,027,023 A | * | 3/1962 | McGrath | 414/276 |
| 3,612,305 A | * | 10/1971 | Wasserman | 414/285 |
| 4,544,318 A | * | 10/1985 | Nagatomo et al. | 198/346 |
| 4,703,558 A | * | 11/1987 | Makinen | 29/784 |
| 5,215,421 A | * | 6/1993 | Smith | 414/276 |
| 5,664,928 A | * | 9/1997 | Stauber | 414/269 |
| 6,011,998 A | * | 1/2000 | Lichti et al. | 700/230 |
| 6,070,320 A | * | 6/2000 | Tomforde et al. | 29/771 |
| 6,321,138 B1 | * | 11/2001 | Livesay et al. | 700/245 |
| 2002/0123918 A1 | * | 9/2002 | Brown et al. | 705/7 |

* cited by examiner

Primary Examiner—James W. Keenan
(74) Attorney, Agent, or Firm—Daniel O'Connor

(57) ABSTRACT

A material handling and manufacturing system which includes separate temporary storage facilities so that loaded trailers may be dropped off without an extended waiting time. The manufacturing method utilizes plural entry ports at various points along an assembly line to reduce in-house storage and handling of materials. A subcombination material handling tray is also disclosed.

1 Claim, 3 Drawing Sheets

MATERIAL HANDLING AND MANUFACTURING SYSTEM AND METHOD

BACKGROUND AND OBJECTS OF THE INVENTION

The present invention is broadly related to the material handling and manufacturing arts as described in U.S. Patent Office Class 414.

The use of business methods such as just-in-time delivery systems has become quite prevalent in recent technology. One problem in the art is that just-in-time delivery systems frequently result in loaded tractor-trailers being backed up for hours waiting to drop off a load. Such backups raise the cost of shipping and waste valuable trucking transport time.

Accordingly, it is an object of the present invention to set forth a material handling system and method which includes temporary trailer storage facilities so that a load may be dropped off with less waiting time.

It is a further object of the invention to demonstrate a manufacturing method wherein a number of entry ports are provided so that manufacturing components can be delivered directly to a desired area.

It is also an object to describe a subcombination fixture or tray element which may be advantageously used in the combination material handling and manufacturing system. Such tray elements enable in-plant work to be done on component parts in a time and space efficient operation.

The overall combination is thus an improvement over currently used just-in-time systems and methods of operation.

These and other objects and advantages of the present invention will be apparent to those of skill in the manufacturing and delivery arts from the description which follows.

PRIOR ART PATENTS AND DESIGNS

U.S. Pat. Nos. 3,674,159 and 4,815,914 illustrate material storage and delivery systems which are broadly related to the present invention.

Other somewhat related designs are shown in U.S. Patent Office Class 414.

The system described herein includes features and method steps of delivery which have not hereto-fore been shown in the prior art.

The subcombination tray element is believed to be classified in U.S. Class 248 which includes support structures.

SUMMARY OF THE INVENTION

A manufacturing plant includes an assembly line which runs near the interior walls of the plant.

The four plant walls include plural entry ports for the supply of specific components as needed at the assembly line.

Trucks are directed to the entry ports or, if a trucking backlog has occured, to temporary storage areas where the loaded trailer may be left in a secure location. Trucker time and labor costs are thus reduced and the truck may be dispatched to pick up another load.

A number of specifically designed tray elements are used to simplify unloading and to enable in-plant work to be performed on the components if needed.

The overall combination facilitates on-time delivery at the needed in-plant location. It thus reduces or eliminates the need for forklift transfer and high-rise storage systems within the plant.

BRIEF DESCRIPTION OF THE DRAWING FIGURES

FULL DESCRIPTION OF A PREFERRED EMBODIMENT

Figure 1:
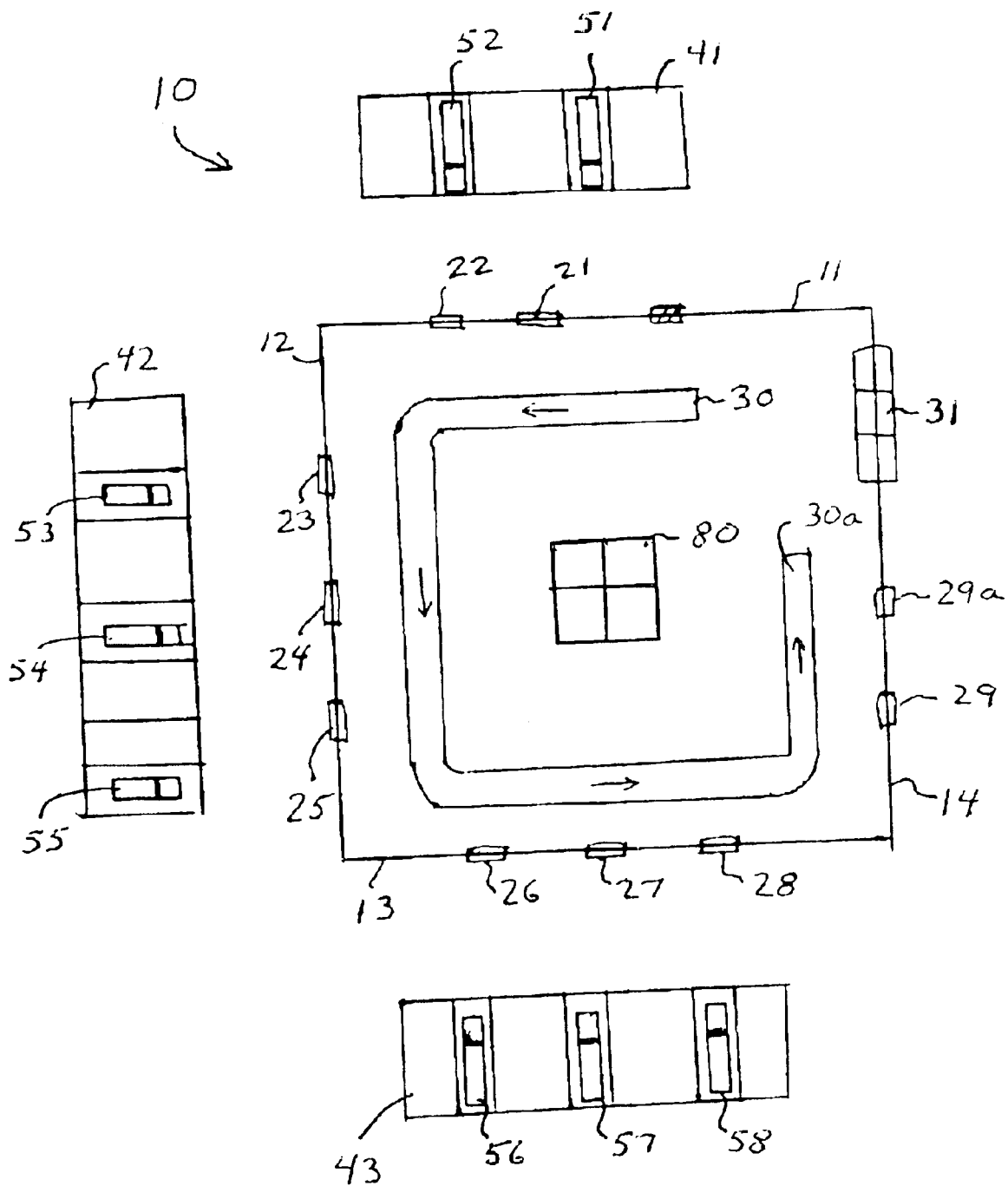
FIG. 1 shows a top schematic view of the overall system including a manufacturing plant and related temporary storage facilities.

Referring to the drawing FIG. 1, a manufacturing plant 10 is shown as having four walls 11, 12, 13 and 14.

Each of the walls 11–14 includes at least two entry ports for the supply of parts/materials to an assembly line. The entry ports are indicated at numerals 21–29a.

The manufacturing plant 10 includes an assembly line 30 which runs around the plant in a position adjacent to the entry ports 21–29. This configuration allows component parts to be delivered directly to the assembly line without requiring in-plant transport means such as forklift trucks.

Exit dock areas are indicated at numeral 31.

Entry ports 29 and 29a may be utilized to supply either component parts or packaging materials to the assembly line 30 which ends at 30a.

In practice of the invention, when the plant 10 is running at full capacity, each of the entry ports 21–28 would have a truck backed up thereto to supply the needed component parts.

In order to insure that component parts are always ready for the assembly line, temporary storage areas 41,42 and 43 are provided to house trailers indicated at numerals 51 through 58. Thus, for example, if a load of components at entry port 21 is rejected, a backup supply is readily available in trailer 51.

The temporary storage areas are important to the overall invention since they allow a truck driver to drop off a trailer without waiting in an hours-long line. Thus, trucking efficiency and delivery rates are increased.

The temporary storage areas 41–43 are structured to provide a secure environment for the trailer loads which may contain very valuable components such as circuit boards, computer chips etc.

Figure 2:
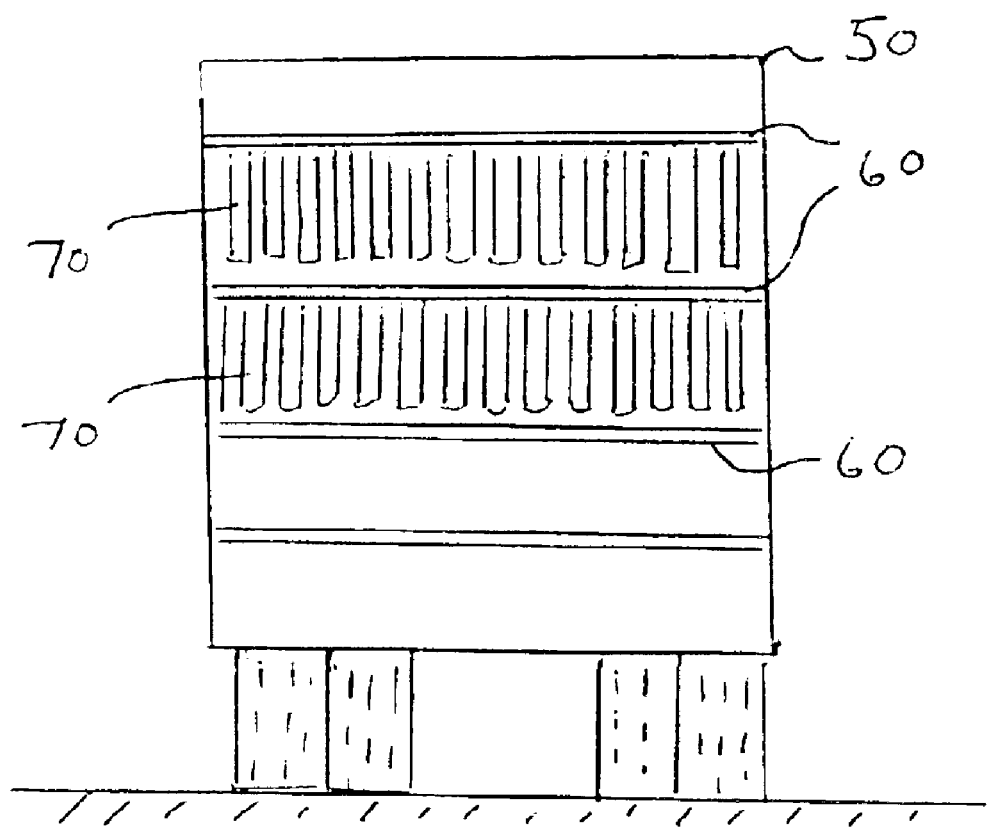
FIG. 2 is an end view of a loaded trailer and illustrates one method of using the plural supporting trays which comprise a subcombination of the invention.

In the trailer end view of FIG. 2, a plurality of slidable racks 60 and rotatable trays 70 are shown as ready to be unloaded from a trailer 50.

As previously noted, each of the trailers is unloaded at a point very close to the point of product usage on the assembly line. The system thus becomes a just-in-time and an in-the-right-place operation.

Figure 3:
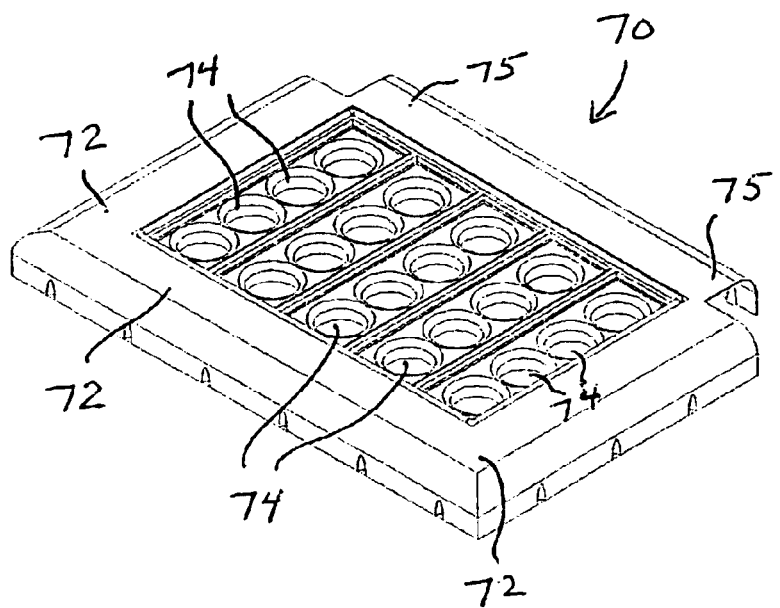
FIG. 3 is a view of one embodiment of a supporting tray which is designed specifically for use in the combined method.
Figure 4:
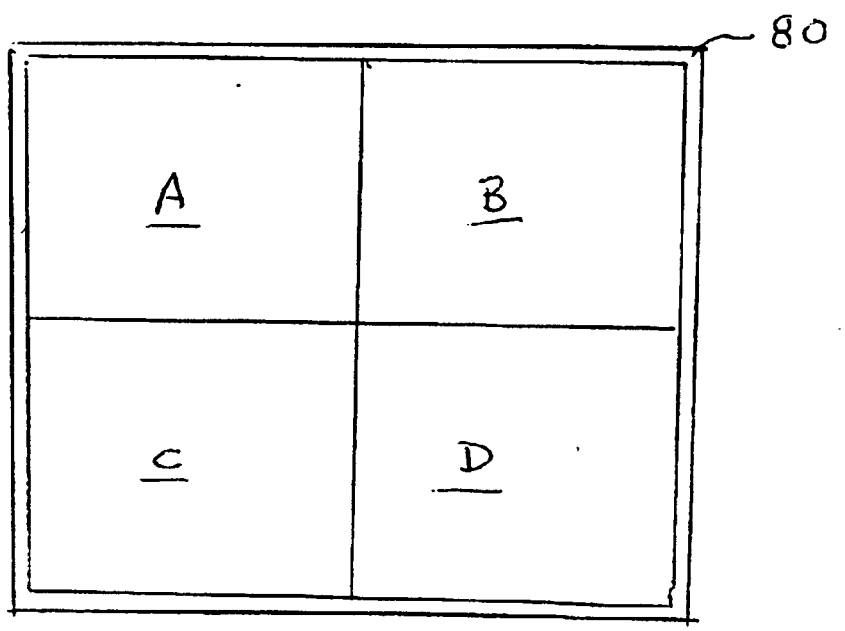
FIG. 4 is a schematic view of an in-plant work station which is utilized in the event that additional work must be performed on the component parts.

FIG. 3 shows an example of a tray 70 used in the combined system and method. Tray 70 is fabricated of plastics or other equivalent compounds.

As shown, tray 70 includes lateral frame elements 72 and a plurality of central cavities 74. Each of the cavities 74 would carry a component such as a circuit board. The tray 70 further has an extended arm 75 formed thereon which may be used for rotary or pivot motion of the tray as needed.

The tray 70 shown in FIG. 3 has five rows of four cavities each. The tray may thus be easily divided into strips if needed for a sub-work operation.

As an example of such a sub-work operation, suppose that twenty components from trailer 51, which have been supplied to entry port 21 and the related area of line 30, need to be drilled before assembly.

A tray 70 may be easily moved by a workman to a sub-work area 80 located at a central area of the plant. The product may then be drilled while still in the tray 70 and then returned to the assembly line.

The use of trays 70 thus results in less transfer of components form one carrier to another and a more efficient and economical operation. Plural plastic trays 70 may be readily mass-produced and easily saved for reuse.

The conveniently located sub-work area 80 may do various functions such as drilling, cutting, welding and heat treating as indicated at A, B, C and D respectively.

The centrally located sub-work area may be used by various workmen along the entire length of the assembly line 30.

The manufacturing and business method steps inherent in the structures described above are as follows:

a) providing a plant 10 which has at least four walls with each wall having plural entry ports formed therein, b) providing an assembly line 30 within the plant with the assembly line being arranged and shaped so that it is in close proximity to(e.g. 5–10 feet) the multiple entry ports, c) providing the system with at least one temporary storage area 41–43 for the storage of loaded trailers to reduce truck in-line time and to insure a just-in-time delivery, d) providing a central sub-work area 80 whereby any needed additional product work which cannot be done on the assembly line is performed, e) utilizing multiple tray elements 70 for transporting components such as computer chips or circuit boards to provide a clean and secure product supply to the assembly line.

While a particular system and manufacturing method have been described above, it is intended in this specification to cover all equivalent systems and methods which would reasonably occur to those of skill in the art.

Other features of the invention may include, for example, a plastic covering means to protect products within the tray units.

The invention is further defined by the claims appended hereto.

I claim:

1. A manufacturing system which incorporates just-in-time and in-the-right-place principles for efficient production, said system including:

a generally rectangular shaped building having a first wall (11) with two entry ports (21,22), a temporary storage building (41) which is in parallel relation to said first wall and has openings for two product-containing trailers (51,52), a second wall (12) in perpendicular relation to said first wall and having three entry ports (23,24,25) formed therein, a temporary storage building (42) which is in parallel relation to said second wall and has openings for three product-containing trailers (53,54,55), a third wall (13) which is in parallel relation to said first wall and which has three entry ports (26,27,28), a temporary storage building (43) which is in parallel relation to said third wall and has openings for three product containing trailers (56,57,58), a fourth wall (14) which is in perpendicular relation to said first wall and which has two entry ports (29,29*a*), an assembly line (30) which is generally rectangular in shape and which passes by each of said entry ports, a central sub-work area means (80) for performing at least one of drilling, cutting, welding and heat treating functions, said central sub-work area, being entirely contained within the perimeter of said assembly line, a unitary plastic tray means (70) for delivering electronic components to said assembly line or to said sub-work area, said tray having extended arm means (75) on one side thereof so that plural trays may be transported in a trailer (50) having racks (60), said tray including twenty identical cavities (74) which are arranged in plural rows and columns and which may be divided into strips for manufacturing efficiency.

* * * * *